(12) United States Patent
Matsuyama

(10) Patent No.: US 11,775,233 B2
(45) Date of Patent: Oct. 3, 2023

(54) PRINT CONTROL SYSTEM, PRINT CONTROL METHOD, PRINT CONTROL DEVICE, AND MEDIA

(71) Applicant: CANON KABUSHIKI KAISHA, Tokyo (JP)

(72) Inventor: Yoichi Matsuyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/831,912

(22) Filed: Jun. 3, 2022

(65) Prior Publication Data
US 2022/0391151 A1 Dec. 8, 2022

(30) Foreign Application Priority Data
Jun. 8, 2021 (JP) .................. 2021-096034

(51) Int. Cl.
*G06F 3/12* (2006.01)
*G06T 7/00* (2017.01)

(52) U.S. Cl.
CPC .......... *G06F 3/1208* (2013.01); *G06F 3/1254* (2013.01); *G06T 7/001* (2013.01); *G06T 2207/10008* (2013.01); *G06T 2207/30144* (2013.01)

(58) Field of Classification Search
CPC .... G06F 3/1208; G06F 3/1254; G06F 3/1204; G06T 7/001; G06T 2207/10008; G06T 2207/30144
USPC ........................................................ 358/401
See application file for complete search history.

(56) References Cited

U.S. PATENT DOCUMENTS

| | | | | |
|---|---|---|---|---|
| 2009/0035016 A1* | 2/2009 | Sanmiya | ............ | G03G 15/6541 414/789 |
| 2014/0270396 A1* | 9/2014 | Miyagawa | ......... | H04N 1/00477 382/112 |

FOREIGN PATENT DOCUMENTS

JP 2010066516 A 3/2010

* cited by examiner

*Primary Examiner* — Darryl V Dottin
(74) *Attorney, Agent, or Firm* — ROSSI, KIMMS & McDOWELL LLP

(57) ABSTRACT

A print control system is provided. The system comprises an image forming unit to form an image onto a sheet; an image reader to read an image of the sheet; an inspection unit to inspect a quality by comparing the image read by the image reader with a reference image. The system forms an image by the image forming unit using a first print setting defined in advance when registering the reference image, registers, as the reference image, an image read by the reading unit, and forms an image by the image forming unit using a second print setting defined in advance when manufacturing a print product.

18 Claims, 12 Drawing Sheets

FIG. 10

JOB TICKET (JDF)

```
<?xml version="1.0" encoding="utf-8"?>
<JDF ID="PAJT" Type="ProcessGroup" xmlns="http://www.CIP4.org/JDFSchema_1_1" Types="Digital
Photo Printing Job" Status="Waiting" Version="1.3" Category="DigitalPrinting" SettingsPolicy="MustHonor"
JobID="A4-T-C2">
  <ResourcePool>
    <CustomerInfo ID="rCustomerInfo1" Class="Parameter" Status="Available" CustomerOrderID=""
CustomerJobName="A4-T-C2">
      <GeneralID IDUsage="IO_CustomerOrderID" IDValue="" Usage="PartsId" IDValue="ab12300051" />
    </CustomerInfo>
    <Component ID="rComponent1" CatalogID="FromOBNG" Class="Quantity"
ComponentType="FinalProduct" Status="Available">
      <GeneralID IDUsage="ProductID" IDValue="ALBUM" />
    </Component>
  </ResourcePool>
</JDF>
```

1000

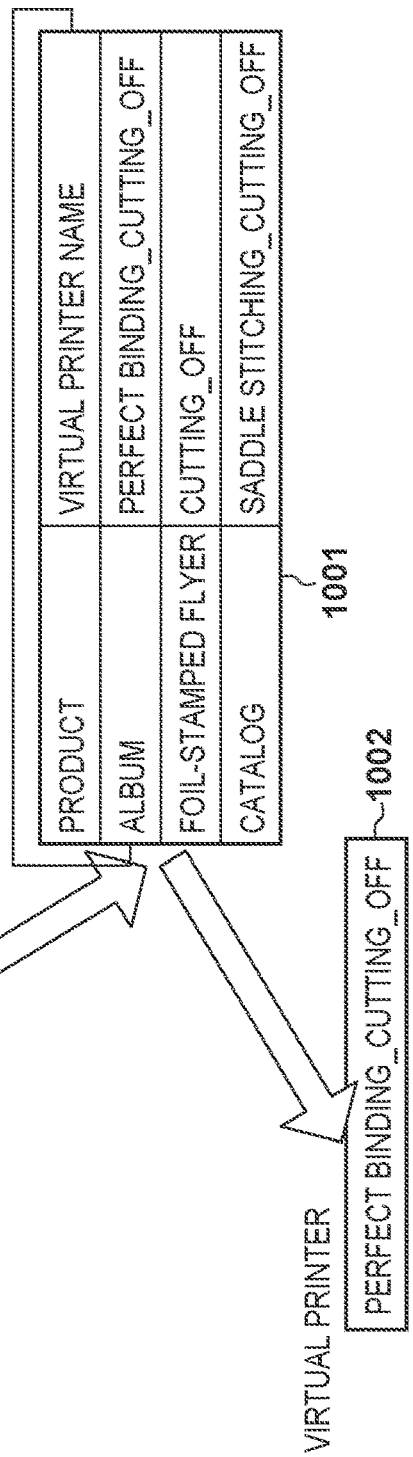

| PRODUCT | VIRTUAL PRINTER NAME |
|---|---|
| ALBUM | PERFECT BINDING_CUTTING_OFF |
| FOIL-STAMPED FLYER | CUTTING_OFF |
| CATALOG | SADDLE STITCHING_CUTTING_OFF |

1001

VIRTUAL PRINTER
PERFECT BINDING_CUTTING_OFF — 1002

FIG. 11
FOIL-STAMPED FLYER
(REFERENCE IMAGE REGISTRATION)
| 1 | FOIL STAMPING (OFF) |
|---|---|
| 2 | IMAGE READING |
| 3 | CUTTING (OFF) |
1100
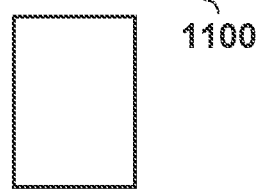
FOIL-STAMPED FLYER
(REFERENCE IMAGE REGISTRATION)
| 1 | FOIL STAMPING (ON) |
|---|---|
| 2 | IMAGE READING |
| 3 | CUTTING (ON) |
1101
NG                OK
FOIL-STAMPED FLYER
(INSPECTION)
| 1 | FOIL STAMPING (ON) |
|---|---|
| 2 | IMAGE READING |
| 3 | CUTTING (ON) |
1102

PRINT CONTROL SYSTEM, PRINT CONTROL METHOD, PRINT CONTROL DEVICE, AND MEDIA

BACKGROUND OF THE INVENTION

Field of the Invention

The present invention relates to an inspection system for inspecting printed matter and, more particularly, to a print control system, a print control method, a print control device, and a medium storing a program for registering a reference image to be used for comparison with printed matter in order to specify the quality of printed matter.

Description of the Related Art

An inspection device which reads printed matter printed by an image forming device and inspects the print quality is known. The inspection device can detect image defects such as dirt and missing print, error of characters, bar code quality, and the like by comparing an image of printed matter that has been confirmed to be of good quality by the user (hereinafter referred to as a reference image) with an image which is a scan of the printed matter from actual printing. Printed matter in which these printing defects are detected is distinguished from printed matter without printing defects by, for example, changing the discharge destination (e.g., see Japanese Patent Laid-Open No. 2010-66516).

When registering a reference image, there are cases where one wants to use the same job as when inspecting but output it after changing print settings. An example of such cases is when one wants to print after turning off a setting for perfect binding in order to improve productivity at the time of reference image registration, because when in-line perfect binding is set, productivity decreases due to a process for perfect binding taking time.

When the same job is used at the time of reference image registration and at the time of inspection, it is necessary to manually repeat the operation of setting post-processing to off at the time of reference image registration and then turning it back to the original at the time of inspection in order to avoid unnecessary in-line post-processing, and due to its complexity, an occurrence of operation error is conceivable.

For this reason, there is a problem that there is no advancement in overall automation because the print settings are changed manually even in a printing environment in which workflow software or the like is used for automation.

SUMMARY OF THE INVENTION

The present invention properly realizes deactivation of unnecessary post-processing at the time of reference image registration and setting of post-processing at the time of actual printing with simple operation.

The present invention has the following configuration. According to one aspect of the present invention, a print control system comprising: an image forming unit configured to form an image onto a sheet in accordance with a print job; an image reader configured to read an image of the sheet; an inspection unit configured to inspect a quality by comparing the image read by the image reader with a reference image read and registered in advance; at least one processor; and at least one memory having at least one program, wherein the at least one processor executes the at least one program in order to: when registering the reference image, form an image by the image forming unit using a first print setting defined in advance, register, as the reference image, an image read by the reading unit, and when manufacturing a product, form an image by the image forming unit using a second print setting defined in advance is provided.

According to another aspect of the present invention, a print control device that controls an image forming device having an image forming unit that forms an image on a sheet in accordance with a print job, an image reader that reads an image of the sheet, and an inspection unit that inspects a quality by comparing the image read by the image reader with a reference image read and then registered in advance, the print control device comprising: at least one processor; and at least one memory having at least one program, wherein the at least one program causes, when executed by the at least one processor, the at least one processor to: when registering the reference image, cause the image forming unit to form an image using a first print setting defined in advance, register, as the reference image, an image read by the reading unit, and when manufacturing a product, cause the image forming unit to form an image using a second print setting defined in advance is provided.

By virtue of the present invention, it is possible to properly realize deactivation of unnecessary post-processing at the time of reference image registration and setting of post-processing at the time of actual printing with simple operation.

Further features of the present invention will become apparent from the following description of exemplary embodiments with reference to the attached drawings.

BRIEF DESCRIPTION OF THE DRAWINGS

FIG. 10 is a diagram for explaining a method of determining the virtual printer that supports a product.

FIG. 11 is a diagram for explaining a case where it is necessary to keep a specific post-process (post-processing) depending on the product.

DESCRIPTION OF THE EMBODIMENTS

Figure 1:
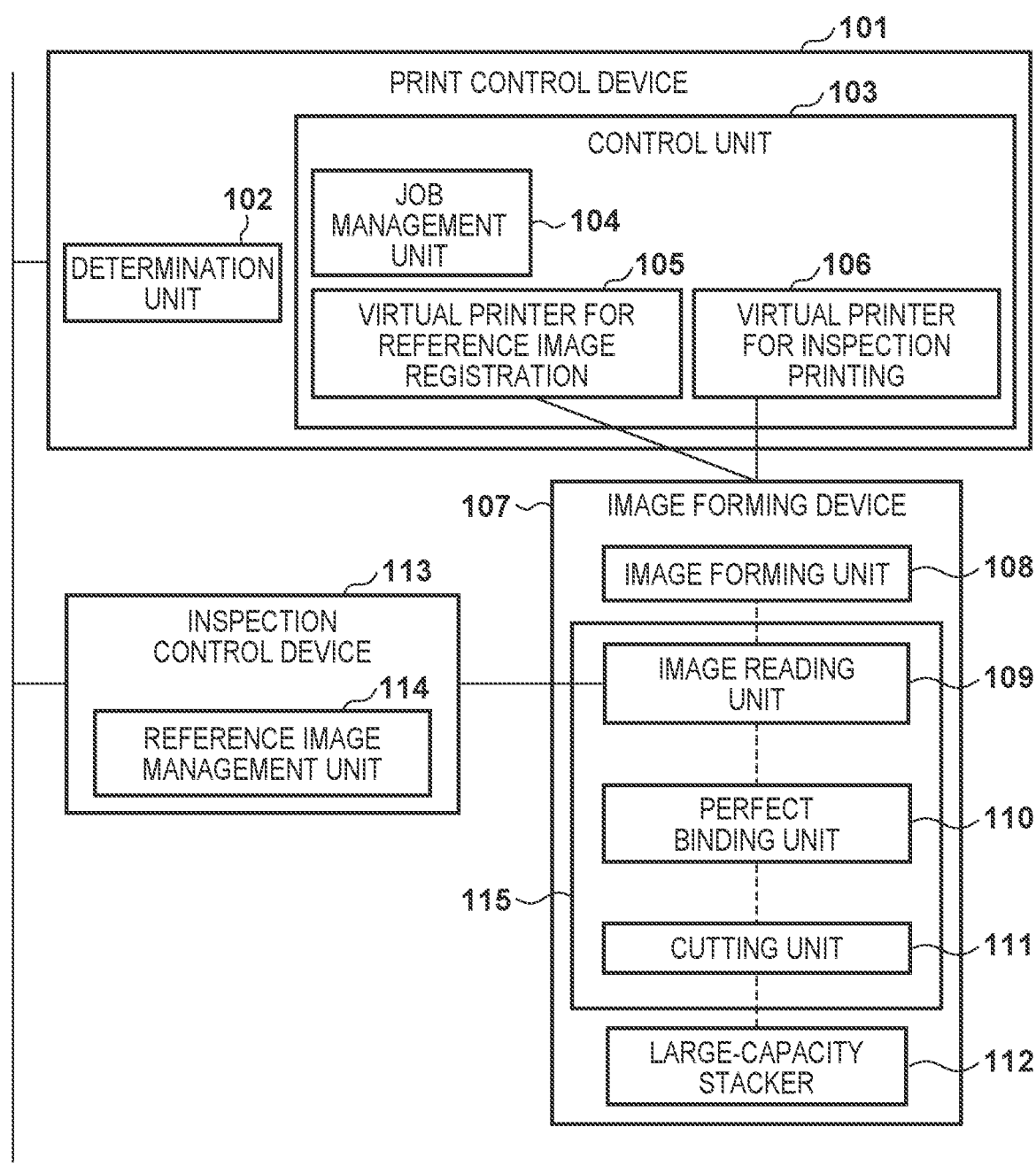
FIG. 1 is a system configuration diagram illustrating a configuration of an inspection system of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<Hardware Configuration>

Figure 2:
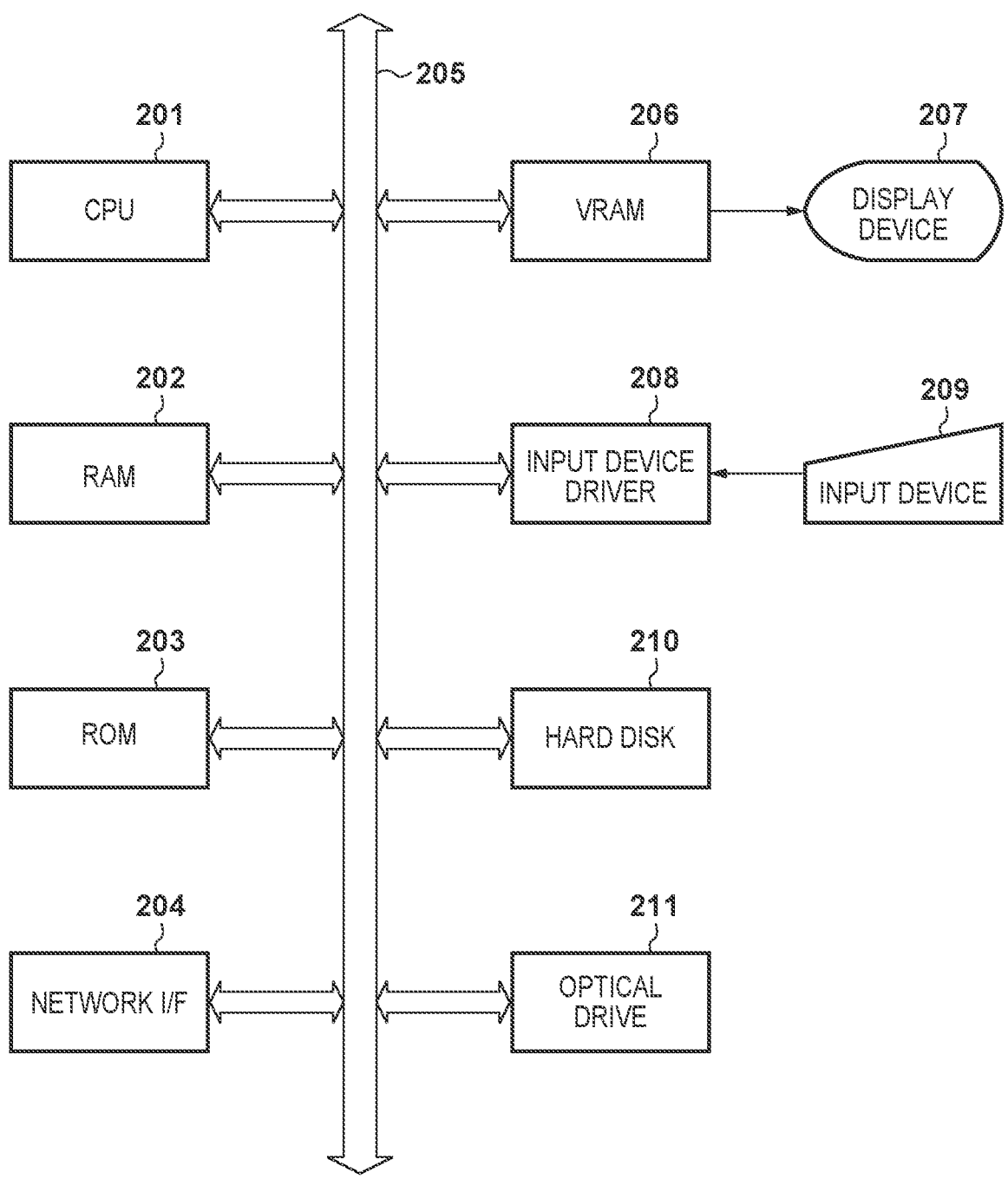
FIG. 2 is a hardware configuration diagram of a PC for operating software of a print control device and an inspection control device.

FIG. 2 is a hardware configuration diagram of a computer (i.e., an information processing device) for executing software (each software module) of an inspection system of the present invention illustrated in FIG. 1. This configuration corresponds to a print control device 101, an image forming device 107, and an inspection control device 113. These are sometimes referred to as a print control system. Also, a procedure implemented by the print control system is sometimes referred to as a print control method.

In the computer, a CPU 201 has a RAM 202 and a ROM 203 which are connected by a bus 205. Further, the computer has a network I/F 204 for connecting with another computer or an image forming device.

Figure 3:
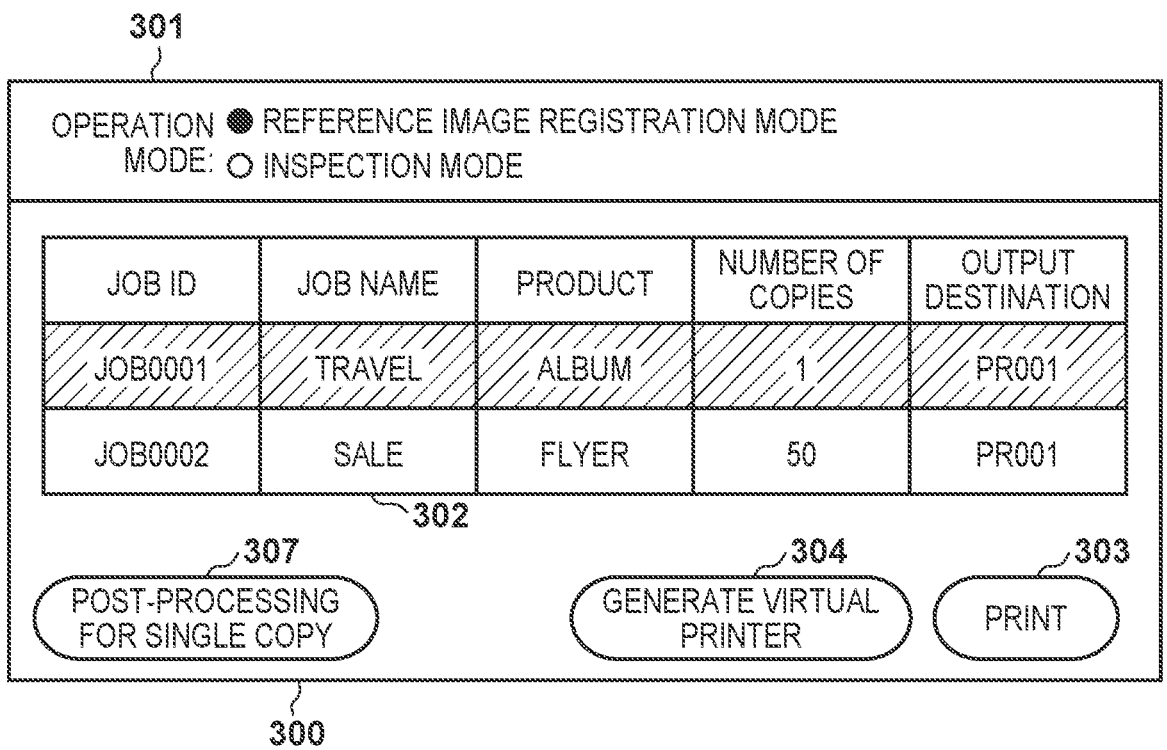
FIG. 3 is a diagram illustrating an example of a UI (User Interface) of the print control device.

It further includes a display device 207, such as a liquid crystal display, and has a VRAM 206 for display. An input device 209 such as a mouse and a keyboard and a corresponding input device driver 208 are provided to process input from a user. These display device 207 and input device 209 may be integrated in a touch panel or the like. By these, UIs such as that illustrated in FIG. 3 is realized.

The computer further includes storage devices, such as a hard disk 210 and an optical drive 211, that are used for storing programs to be used in the system, temporarily storing data, and the like.

The image forming device is the same as in FIG. 2 in that it also includes a CPU and a memory. However, the image forming device 107 has a configuration for image formation and post-processing. For example, an image forming unit 108 includes an electrophotographic image forming unit and includes a sheet feed tray and a sheet feed unit for supplying a sheet to the image forming unit. In addition, it has a double-sided unit for forming an image on both sides of a sheet and a conveyance path including a mechanism for switching between a post-processing unit and a tray for low-quality sheets in accordance with a result of quality inspection. An image reading unit 109 is disposed in the conveying path, and it is possible to capture both sides of a sheet on which an image has been formed by a camera or the like. Here, although the post-processing unit is generally downstream of the image reading unit 109 in a conveying direction of a sheet, that is not always the case. For example, as described in a second embodiment, the post-processing unit for foil stamping processing or embossing processing and the like may be upstream of the image reading unit 109.

The inspection control device 113 is the same as in FIG. 2 in that it also includes a CPU and a memory. However, the inspection control device 113 may have dedicated hardware for comparing two images at high speed.

<System Configuration>

FIG. 1 is a system configuration diagram illustrating a configuration of the inspection system of the present invention. Solid lines connecting the elements in FIG. 1 indicate a network, and dotted lines indicate a conveyance path of printing paper. The inspection system is configured by the print control device 101, the image forming device 107, and the inspection control device 113. The later-described post-processing unit is connected in-line to the image forming device.

<Print Control Device>

The print control device 101 sends a job to an appropriate virtual printer according to a mode of operation of the inspection system and controls the generation of printed matter. A virtual printer is a function that registers a virtual printer in advance and performs printing with prepared print settings by a predetermined printer, for example, a network connection printer. That is, the virtual printer of the present embodiment is particularly focused on predetermined setting values, so the virtual printer can also be described as a set of setting values for predetermined printing settings. As print settings, for example, settings related to printing such as paper type, number of copies, and double-sided printing, and settings for post-processing by a device which is connected in-line to the printer, can be registered. In addition, the print control device 101 may be referred to as a reference image registration system, because it controls printing settings at the time of inspection and at the time of reference image registration. Also, it is sometimes referred to as an inspection system including the inspection control device 113. The inspection system may also include the image forming device 107.

The print control device 101 has a UI for operating the inspection system. The UI of the print control device 101 is illustrated in a UI screen 300 of FIG. 3. Buttons 301 are toggle buttons for switching operation modes. The print control device 101 has a variable (MotionMode) that holds its operation mode and holds the operation mode received through the operation mode switching toggle buttons 301 in this variable (MotionMode). Table 1 indicates an example of the variable MotionMode of the print control device 101. To register a reference image, a reference image registration mode is set to ON. When performing inspection in normal printing, an inspection mode is set to ON.

TABLE 1

| Print Control Device Variable | | |
|---|---|---|
| Variable Name | Value | Description |
| MotionMode | Reference Image Registration Mode (/Inspection Mode) | Operation Mode of Print Control Device |

A job list display unit 302 displays job information that has been read by the print control device 101 and then held in the job management unit 104. An example of job information is indicated in Table 2. The job information includes a "job ID" which is an identifier for identifying the job and a "job name" which is a name of the job. Further, it includes items such as a "product name" indicating the type of job, the "number of copies" indicating the number of times the job is to be generated, "print settings" such as a post-process and paper information, and an "output destination" indicating an output printer.

The number of copies and the like can be changed in the job list display unit 302. A value changed by a user operating the job list display unit 302 is reflected in the job information held by the job management unit 104.

TABLE 2

| | | Job Information | | |
|---|---|---|---|---|
| Job ID | Job Name | Product Name | Number of Copies | Print Settings | Output Destination |
| JOB0001 | Travel | Album | 1 | A4, Perfect Binding | PR0001 |
| JOB0002 | Sale | Flyer | 50 | A4, Single-Sided | PR001 |

A print button 303 is a button for an operator to instruct printing, and when the print button 303 is touched, the job selected using a virtual printer corresponding to a designated operation mode is executed. A virtual printer generation button 304 is a button for generating a new virtual printer, and can generate a new virtual printer when the virtual printer generation button 304 is touched. Details will be described later with reference to FIG. 4. A single-copy-post-processing button 307 will be described in the second embodiment. In the present embodiment the single-copy-post-processing button 307 need not be provided.

The association between an operation mode and a virtual printer may be fixed, for example, by the name of the virtual printer, or may be set in the setting of a virtual printer. In the case of fixed association, for example, a virtual printer having the name "for reference image registration" may be associated with the reference image registration mode, and a virtual printer having the name "for inspection printing" may be associated with the inspection mode.

Returning to FIG. 1, a determination unit 102 determines an output destination suitable for the operation mode. In the present embodiment, the determination unit 102 determines an appropriate virtual printer, and the print control device 101 sends a job to the determined virtual printer. In contrast, the print control device 101 may realize the same processing by generating a job ticket.

A control unit 103 transmits a job to the image forming device 107 using an appropriate virtual printer in accordance with the determination by the determination unit 102. In the present embodiment, a job is transmitted to a virtual printer selected by the determination unit 102 from virtual printers prepared in advance.

The job management unit 104 performs acquisition, editing, deletion, and the like of a job. A job managed by the job management unit 104 is recorded in the job information indicated in Table 2 described above, and the same job information is used in both the reference image registration mode and the inspection mode.

A virtual printer for reference image registration 105 is used for printing at the time of reference image registration. A virtual printer for inspection printing 106 is used for printing at the time of inspection. Inspection printing refers to printing (or a print job) in which setting has been made so as to perform inspection, and a virtual printer for inspection printing is a virtual printer that is used for printing in which setting has been made so as to perform inspection.

<Image Forming Device>

The image forming device 107 processes a job transmitted from the print control device 101, prints the job onto paper, and then performs post-processing. In the image forming device 107, the image forming unit 108 generates an image from print data and prints it on printing paper. An in-line processing unit (also referred to as a post-processing unit) 115 indicates a configuration of an image reading unit and in-line post-processing units that follow the image forming unit 108.

The image reading unit 109 reads, using a scanner, an image printed on printing paper by the image forming unit 108 and sends it to the inspection control device 113. A perfect binding unit 110 performs perfect binding on printing paper printed by the image forming unit 108 in accordance with an instruction from the print control device 101. A cutting unit 111 cuts an unnecessary portion of printed matter bound by the perfect binding unit 110 in accordance with an instruction from the print control device 101. A large-capacity stacker 112 holds printed matter that has passed inspection. Failed printed matter is discharged to a separate discharge port (an upper tray) provided in an upper portion.

There are various types of in-line processing device, such as a puncher that performs processing for punching a hole in printing paper (punching) and a stapler for performing stapling processing, may be used in the in-line processing unit 115 in addition to the illustrated perfect binding unit 110 and cutting unit 111. Further, depending on the type of image forming device 107, the image reading unit 109 may be configured such that another post-processing machine is disposed between the image forming unit 108 and the image reading unit 109 rather than being immediately after the image forming unit 108.

<Inspection Control Device>

The inspection control device 113 sets its operation mode after receiving a notification of switching of operation modes from the print control device 101. In the reference image registration mode, an image acquired by the image reading unit 109 is stored as a reference image in a reference image management unit 114. On the other hand, in the inspection mode, an image acquired by the image reading unit 109 is determined pass/fail by being compared with a reference image. Depending on the determination result, a tray to which an inspection target sheet is discharged is controlled as described above. The reference image management unit 114 manages the correspondence between a product and a reference image. A product refers to printed matter produced by processing including post-processing.

In the first embodiment, description will be given using an example of a print product (a product, here an album) manufactured by printing and a process by the post-processing units (the perfect binding unit and the cutting unit). It is assumed that the virtual printer for reference image registration is registered under the name "for reference image registration" and the virtual printer for inspection printing is registered under the name "for inspection printing".

<Flow for Registering Reference Image>

Figure 12:
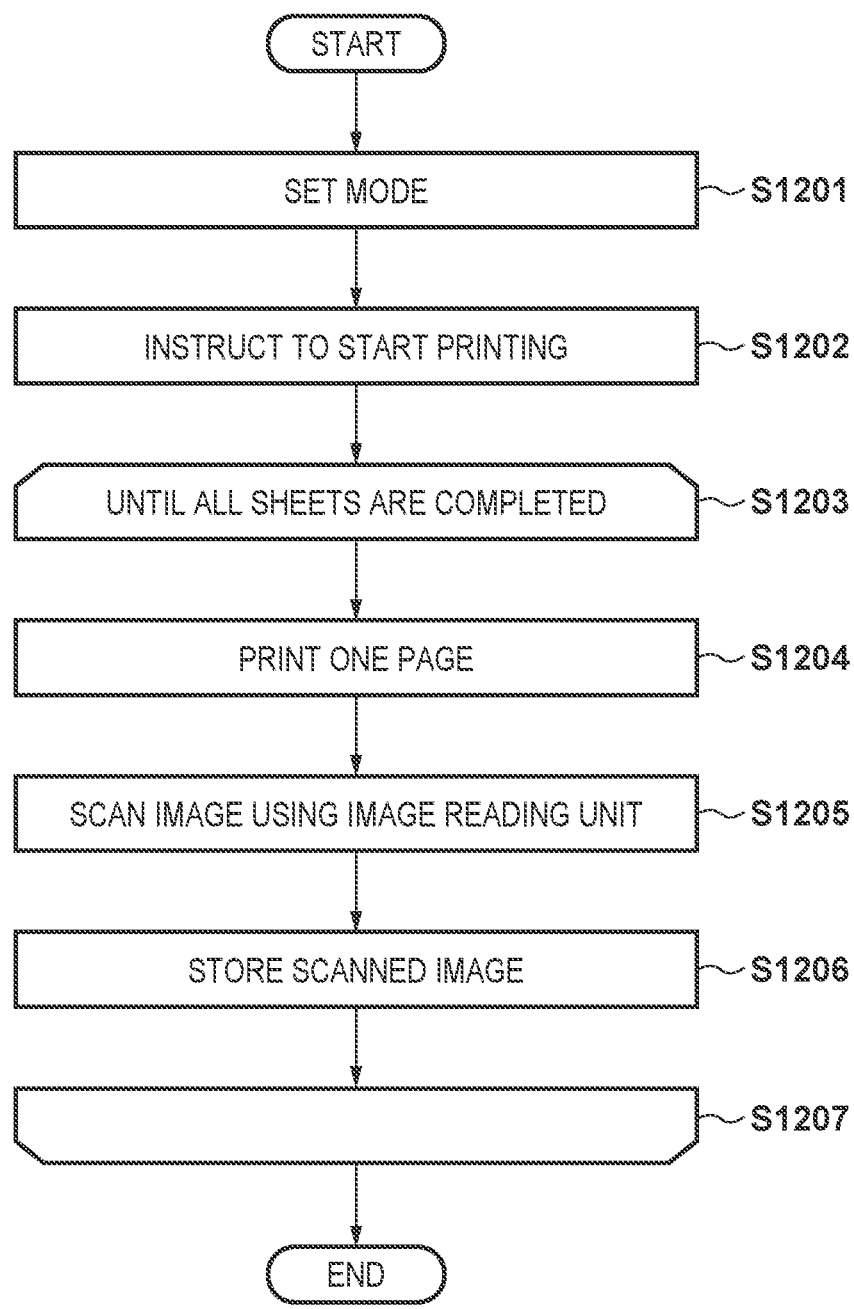
FIG. 12 is a reference image registration processing flow for registering a reference image for inspection.

FIG. 12 is an operation flowchart for when registering a reference image for inspection. Step S1201 and step S1202 in the flow are performed by the print control device 101 and are realized, in particular, by a processor (i.e., the CPU 201) executing a program loaded into a memory such as the RAM 202. Step S1204 to step S1206 are performed by the image forming device 107.

In step S1201, the print control device 101 receives the operation of switching to the reference image registration mode from the user via the operation mode switching toggle buttons 301 of the UI.

Next, the processing proceeds to step S1202, and when a print start instruction is received from the user through the print button 303 of the UI, the print control device 101 starts printing with a job selected in the job list 302 as a print target. Further, the print control device 101 notifies the inspection control device 113 of the operation mode received in step S1201 and a job ID of the job for which printing has been started. The inspection control device 113 that has received the "reference image registration mode" as the operation mode operates in the received operation mode, that is, the reference image registration mode, thereafter. The print control device 101 selects, as a virtual printer to be used at this time, a virtual printer that accords with the operation mode. The virtual printer for reference image registration 105 is selected. A print job is executed in accordance with settings of the virtual printer for reference image registration 105. Details of step S1202 are explained in FIG. 8.

Next, the processing proceeds to step S1203, and step S1204 to step S1207 are repeated until all the sheets of a job started in step S1202 have been processed.

In step S1204, the image forming unit 108 prints an image of a print job on printing paper.

Next, in step S1205, the image reading unit 109 scans the sheet printed in step S1204 and transmits the result to the inspection control device 113.

In step S1206, the inspection control device 113 registers the received image as a reference image in the reference image management unit 114 in a form in which it is associated with the job ID received in step S1202. Further, when printed matter of a plurality of pages is an inspection target, information indicating order may be associated with a reference image. This information may be non-explicit information such as order of image files. In the case of double-sided printing, information indicating a distinction between a front surface and a back surface may be associated with a reference image.

Next, in step S1207, if printing for the job started in step S1202 is still remaining, the processing returns to step S1203 and then is repeated, and otherwise, the processing is terminated.

In step S1205, a printed image is scanned every time a page is printed, but the image reading unit may scan both sides at the same time after printing is performed on both sides of one sheet. In such cases, in step S1204, printing is performed on both sides of a sheet, and in step S1205, the image reading unit scans, at the same time, images printed on both sides of the sheet.

<Procedure for Selecting Virtual Printer>

Figure 8:
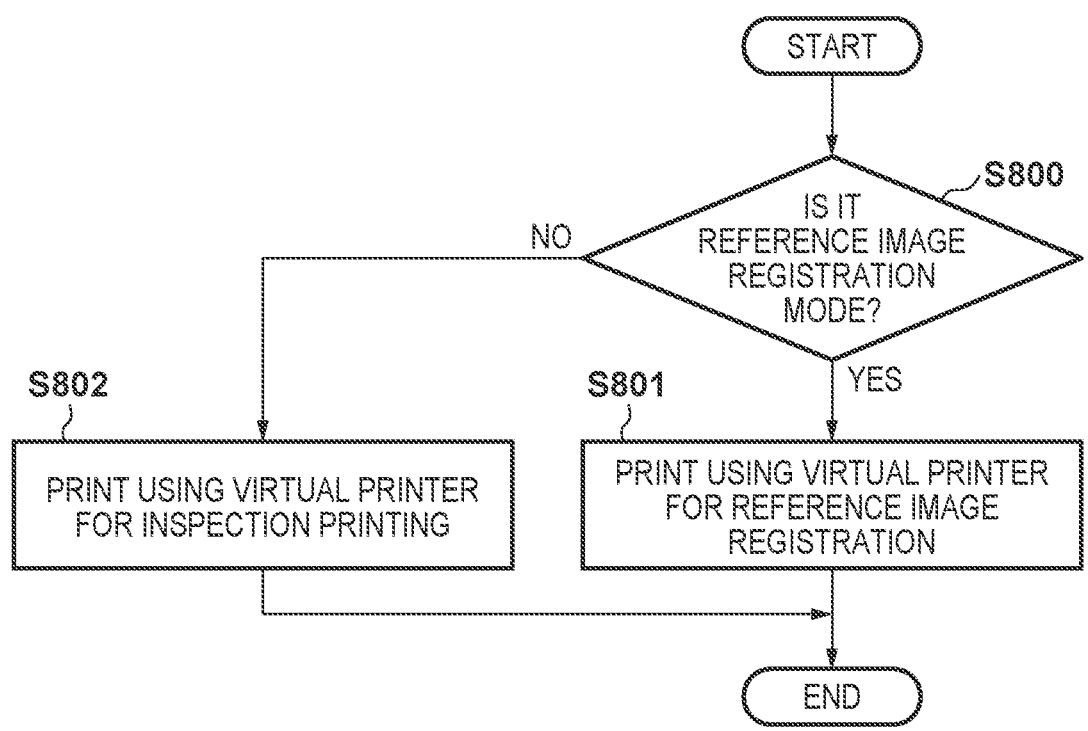
FIG. 8 is a processing flow of the print control device of a first embodiment of the present invention.

FIG. 8 illustrates a processing flow for selecting a virtual printer in step S1202 of FIG. 12 (and step S1302 of FIG. 13 to be described later).

In step S800, the print control device 101 determines whether or not the variable MotionMode that the user designated by the operation mode switching toggle buttons 301 is the reference image registration mode and proceeds to step S801 if it is the reference image registration mode and to step S802 otherwise.

In step S801, the determination unit 102 selects, as a virtual printer to be used for printing, a virtual printer whose name is "for reference image registration". Then, the print control device 101 transmits a job to the virtual printer "for reference image registration" and starts printing.

In step S802, the determination unit 102 selects, as a virtual printer to be used at the time of printing, a virtual printer whose name is "for inspection printing". The print control device 101 transmits a job to the virtual printer "for inspection printing" and starts printing.

In the present embodiment, the determination unit 102 selects a virtual printer to be used by a name of a virtual printer, but a configuration may be taken so as to hold a table of correspondence between the variable MotionMode and a virtual printer and determine a virtual printer by referencing the table.

<Inspection Flow>

Figure 13:
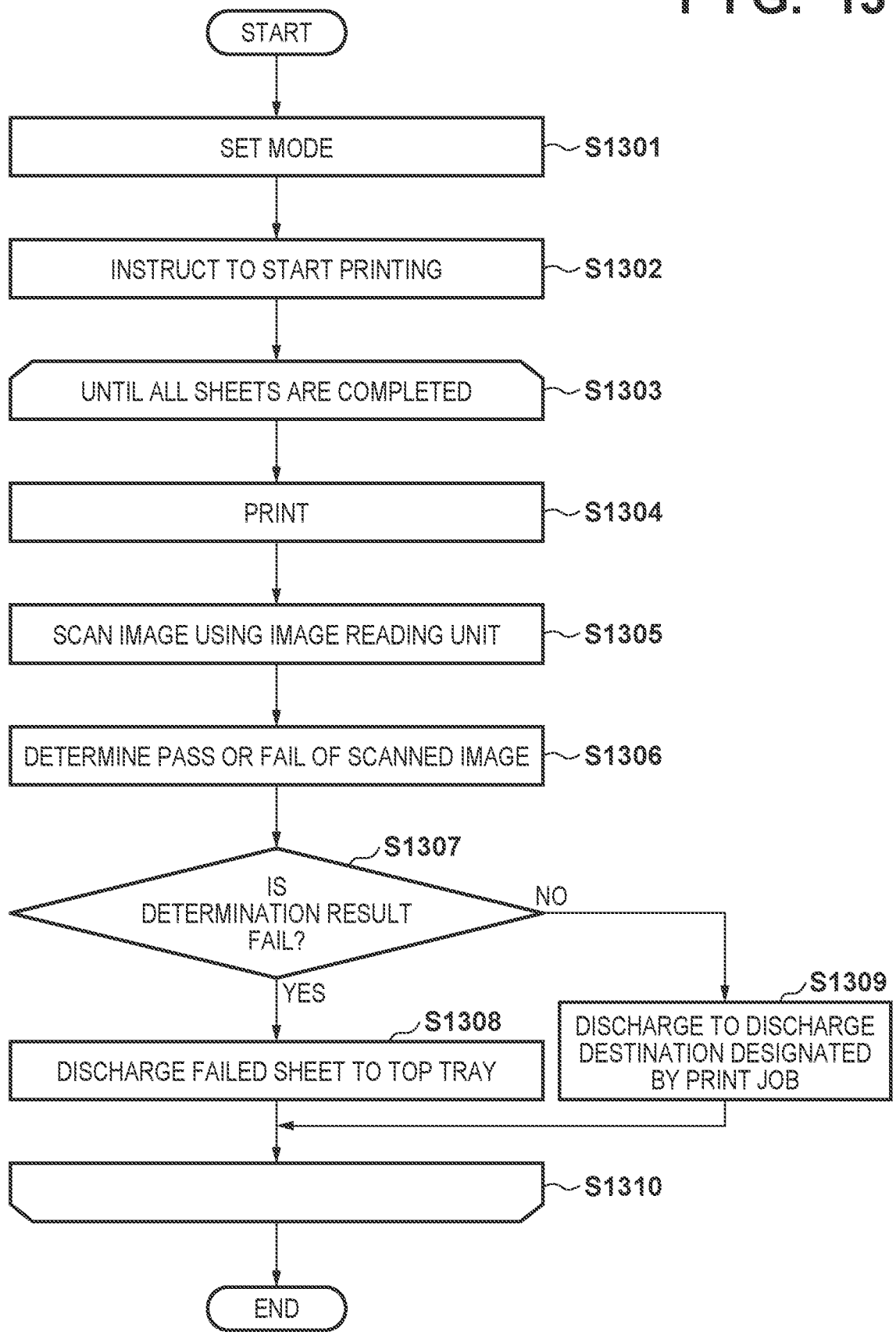
FIG. 13 is a processing flow for inspection.

FIG. 13 is an operation flowchart for explaining operation at the time of inspection. Step S1301 and step S1302 in the flow are performed by the print control device 101 and is implemented, in particular, by a processor (i.e., the CPU 201) executing a program loaded into a memory such as the RAM 202. Step S1304 to step S1309 are performed by the image forming device 107. Among these, step S1306 may be executed by the inspection control device 113 and then a result thereof may be transmitted to the image forming device 107 or may be executed by the image forming device 107 that has received a result of image comparison from the inspection control device 113.

In step S1301, the print control device 101 receives the operation for switching to the inspection mode from the user via the operation mode switching toggle buttons 301 of the UI.

Next, the processing proceeds to step S1302, and when a print start instruction is received from the user through the print button 303 of the UI, the print control device 101 starts printing with a job selected in the job list 302 as a print target. The data of the job is the same as the data used at the time of reference image registration described in FIG. 12. Further, the print control device 101 notifies the inspection control device 113 of the operation mode received in step S1301 and a job ID of the job for which printing has been started. The inspection control device 113 that has received the "inspection mode" as the operation mode operates in the received operation mode, that is, the inspection mode, thereafter. The print control device 101 selects, as a virtual printer to be used at this time, a virtual printer that accords with the operation mode. The virtual printer for inspection printing 106 is selected. A print job is executed in accordance with settings of the virtual printer for inspection printing 106. In step S1302, the processing of FIG. 8 may be executed as in FIG. 12.

Next, the processing proceeds to step S1303, and step S1304 to step S1310 are repeated until all the sheets of a job started in step S1302 have been processed.

In step S1304, the image forming unit 108 prints an image of a print job on printing paper.

Next, in step S1305, the image reading unit 109 scans the sheet printed in step S1304 and transmits the result to the inspection control device 113.

In step S1306, since the inspection control device 113 is operating in the inspection mode designated in step S1301, a reference image registered in the reference image management unit 114 and a received image are compared. It is assumed that this reference image is stored, in advance before the start of this flow, in the flow explained in FIG. 12. In the operation of this comparison, firstly, image positions of a reference image and a scanned image to be inspected are aligned using characteristic points of an image as reference points for alignment. Next, in the scanned image to be inspected, it is detected whether an image is misaligned with respect to the paper by analyzing the four corners of the paper and the alignment reference points of the scanned image. Next, density values of the reference image and the scanned image to be inspected are compared for each pixel. When printed matter of a plurality of pages is to be inspected and in the case of double-sided printing, a corresponding reference image is selected in accordance with a scanned page.

If no defect is detected as a result of the above, an inspection result will be OK. If there is defect in any of the inspection items, a result of the inspection will be fail. For example, in the above example, when a positional misalignment exceeds a predetermined threshold or when the number of pixels whose difference in density values for each pixel exceeds a predetermined threshold exceeds a predetermined number, it may be determined that there is a defect. In addition, if a bar code is included, a quality evaluation may be performed. In the case of a bar code, it may be determined that there is no defect if a region thereof is specified and it can successfully be read as a barcode when tried. Of course, these items are examples, and other inspection items may be included. When a plurality of reference images are registered in the inspection control device 113, it is assumed that a corresponding reference image is read with reference to a job ID.

Next, in step S1307, if the inspection result determined in step S1306 is OK, the processing proceeds to step S1309 and discharge to a tray designated by the print job is instructed. Then, step S1303 to step S1309 are repeated until all the sheets have been inspected. When all the sheets have been inspected, the processing proceeds to step S1310, and then the inspection control device 113 ends the processing.

In step S1307, if the inspection result is fail, the processing proceeds to step S1308. In step S1308, the inspection control device 113 instructs discharge to a tray for failed sheets, for example, a top tray of the large-capacity stacker 112. Then, the processing proceeds to step S1310, and thereafter, it is possible to terminate the processing in the same manner as in the above-described case where the inspection result is OK.

Since setting of the operation mode is performed in the first step in both FIG. 12 and FIG. 13, which mode to operate in can be determined in the subsequent steps. Therefore, for example, configuration may be taken so as to determine the operation mode between step S1202 and step S1203 of FIG. 12 and then branch to step S1203 if it is the reference image registration mode and branch to step S1303 of FIG. 13 if it is the inspection mode.

<Virtual Printer>

In this embodiment, a virtual printer is used to perform processing in accordance with the operation mode. A virtual printer is an application by which, when a job is transmitted, printing and post-processing can be performed by a preset image forming device with print settings including preset in-line post-processing. If cutting is turned off (i.e., deactivated) and locked in a virtual printer, the settings in which cutting is turned off will not be overwritten by the settings of a job, and so cutting will not be performed, and the desired result can be obtained. Here, locking is a meta setting that gives priority to the settings of a virtual printer over the settings of a job to be processed by that virtual printer. That is, if it is not locked, the settings set for a job are used. At this time, for example, if a job is set to use the setting of a virtual printer, the setting of the virtual printer is used.

Figure 14:
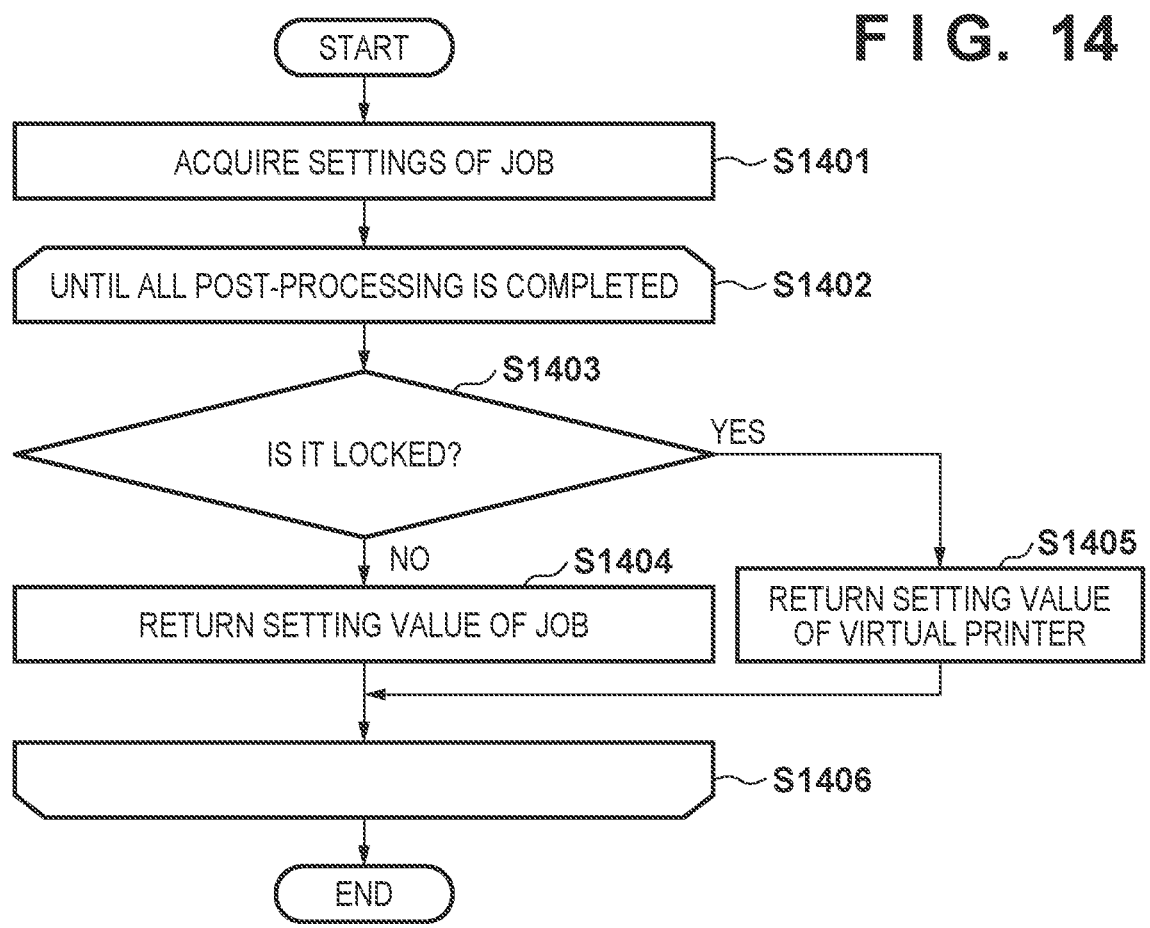
FIG. 14 is a processing flow for determining setting values in the virtual printer.

FIG. 14 explains a procedure for the print control device 101 to determine print settings. A virtual printer that has received a job determines, from the print settings of a job and the print settings of the virtual printer itself, settings 708 to be outputted in accordance with the processing flow of FIG. 14. Here, the virtual printer is the virtual printer for reference image registration 105 or the virtual printer for inspection printing 106 illustrated in FIG. 1, which are different in their settings but both use the image forming device 107 as their printer. Although the virtual printer is a performer in the following description, the virtual printer is a software module realized by being executed by a processor of the print control device 101, and so it can be said that a hardware execution constituent is the print control device 101.

In step S1401 of FIG. 14, the virtual printer obtains print settings from a sent job and then proceeds to step S1402. Between step S1402 and step S1406, the virtual printer determines the setting values by the following processing flow for each setting item of the print settings set in the job.

In step S1403, the virtual printer determines whether or not a setting item to be processed is locked. The determination is made by referring to whether or not a corresponding setting value of the virtual printer is locked, and if it is locked, the processing proceeds to step S1405; otherwise, the processing proceeds to step S1404.

In step S1404, the virtual printer sets, as the setting value of the setting item to be processed, the setting value designated in the print settings acquired from the job. At this time, if a print setting of the job is designated to use a setting value of the virtual printer, the setting of the virtual printer is applied.

In step S1405, a virtual printer sets, as the setting value of the setting item to be processed, the setting value designated in the virtual printer.

If all the setting items have been processed in step S1406, the flow is terminated; otherwise, the processing returns to step S1402, and then the setting value of an unprocessed setting item is determined. The setting values outputted in the procedure of FIG. 14 becomes the print settings for printing a target job.

Figure 7:
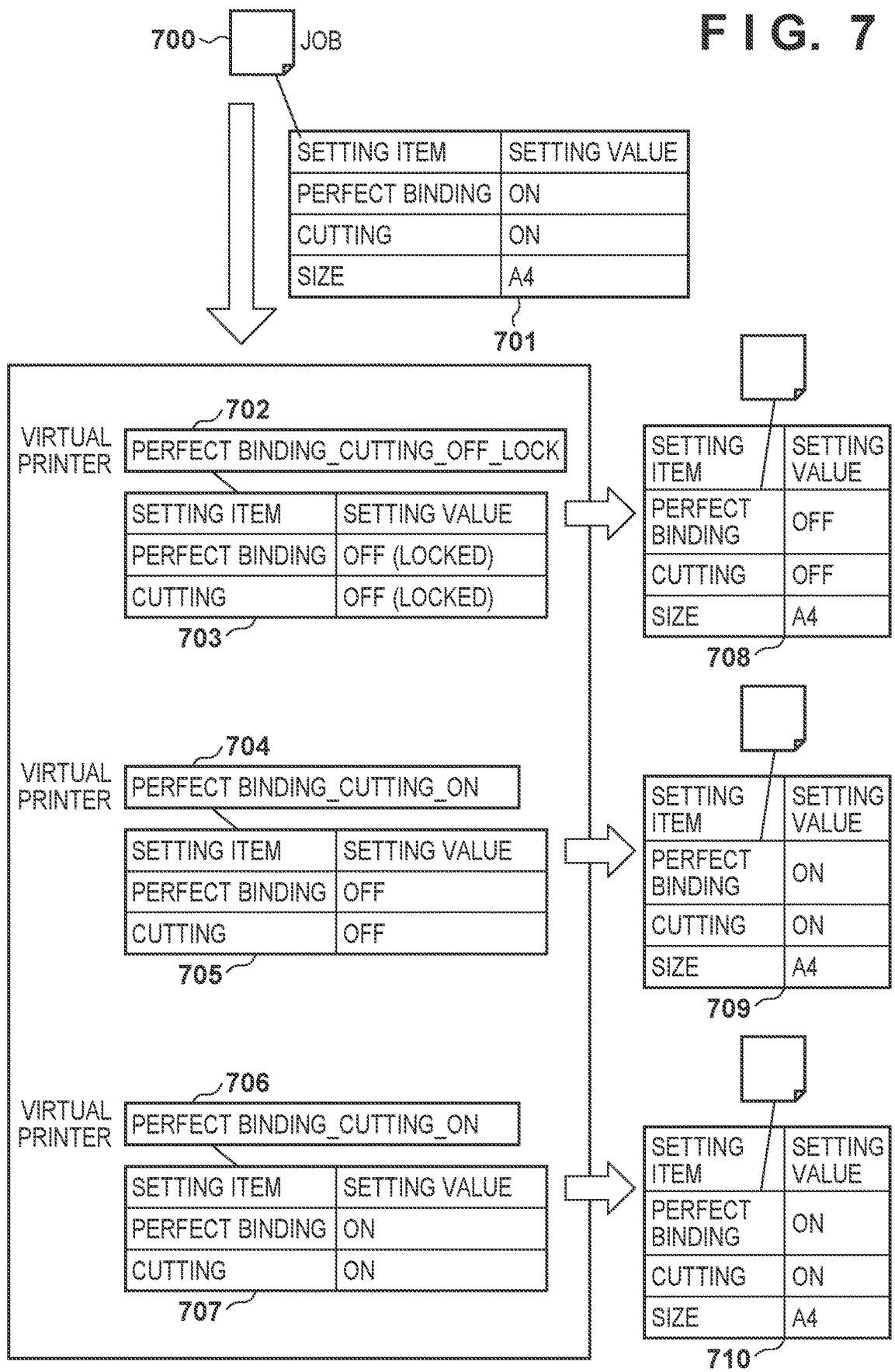
FIG. 7 is a diagram for explaining a change in post-processing settings for a job by a virtual printer of the present invention

FIG. 7 is an example of the setting values of a job obtained in accordance with the procedure of FIG. 14 when the settings are locked or not locked in the virtual printer.

A job 700 includes settings, and a job ticket holds, as attributes (or settings) of the job, print settings information 701 such as whether or not to use (on or off of) each of the post-processing units connected in-line with the image forming device 107 and a paper size. The job 700 is configured by print data and a job ticket and is stored in a job ID folder in a folder managed by the job management unit 104. In this example, in the job 700, as settings 701, both perfect binding and cutting are turned on (i.e., set) as the settings of the post-processing units, and A4 is designated as the size.

The virtual printer 702 is a virtual printer (perfect binding_cutting_OFF_LOCK) in which post-processing settings have been turned off and then locked, and similarly to the settings 703 of the job, information on whether or not to use (on or off of) the post-processing units is held as attributes of the virtual printer. Since these settings are locked here, the settings of the virtual printer take priority even if they differ from the setting values of the job.

A virtual printer 704 is a virtual printer (perfect binding_cutting_OFF) in which post-processing settings have been turned off and have not been locked, and a virtual printer 706 is a virtual printer (perfect binding_cutting_ON) in which post-processing settings have been turned on and have not been locked. Each setting value is as indicated in settings 705 and settings 707.

When the print control device 101 transmits the job 700, the settings 708, 709, and 710 are outputted from the virtual printers 702, 704, and 706, respectively. That is, in the settings 708 obtained when the virtual printer 702 is used, both perfect binding and cutting are the same as the settings of the virtual printer. In the settings 709 and 710 obtained when the virtual printers 704 and 706 are used, perfect binding and cutting are the same as the settings of the print job.

From FIG. 7, it can be seen that the virtual printer 702 in which post-processing has been turned off and locked is necessary to achieve settings in which the post-processing settings are off when the job 700 for which post-processing is on is taken as input. Therefore, the virtual printer for reference image registration 105 and the virtual printer for inspection printing 106 are set as will be described below.

<Settings of Virtual Printers>

In the virtual printer for inspection printing 106, settings have been made so as to neither designate nor lock post-processing and the settings set in a job are made to be used. Table 3 indicates the settings of the virtual printer for inspection printing 106.

TABLE 3

| Setting for Virtual Printer for Inspection Printing | | |
| --- | --- | --- |
| Post-Processing | Settings (Other Values That Can be Set) | Lock |
| Perfect Binding | Off | Off |
| Foil Stamping | Off | Off |
| Cutting | Off | Off |

In addition, the settings of the virtual printer for reference image registration 105 are indicated in Table 4.

TABLE 4

| Setting for Virtual Printer for Inspection Printing | | |
| --- | --- | --- |
| Post-Processing | Settings (Other Values That Can be Set) | Lock (Other Values That Can be Set) |
| Perfect Binding | Off (/On) | On (/Off) |
| Foil Stamping | Off (/On) | On (/Off) |
| Cutting | Off (/On) | On (/Off) |

The virtual printers 105 and 106 are generated by the print control device 101 after pressing (or touching) of the virtual printer generation button 304 of FIG. 3 by the user is received and the print setting are set. When the virtual printer generation button 304 is pressed, the UI of FIG. 4 is displayed, and settings can be made therein.

<Virtual Printer Setting UI>

Figure 4:
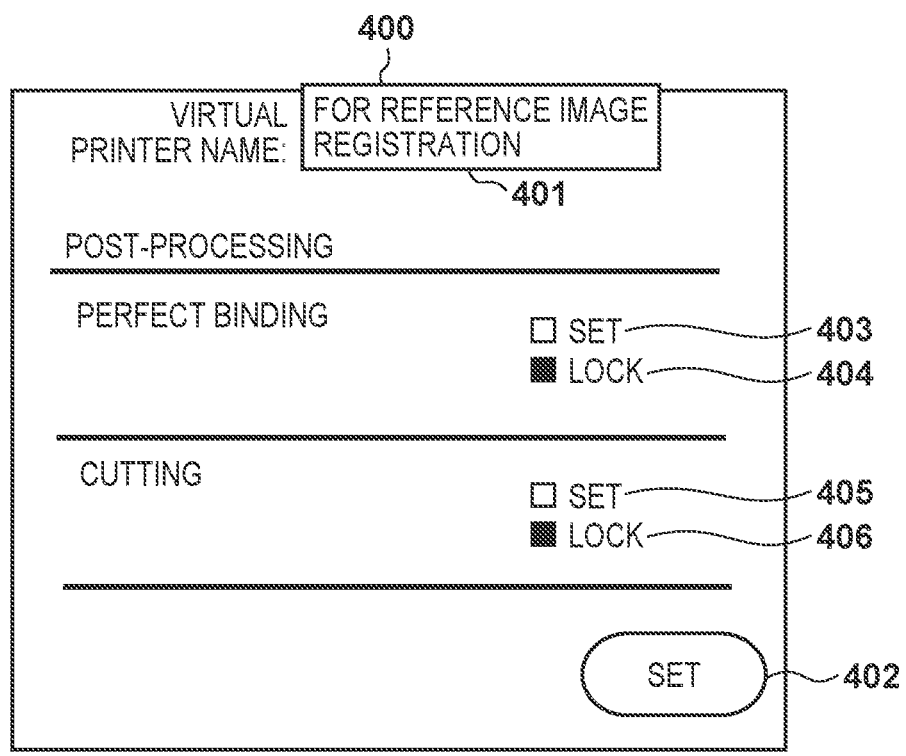
FIG. 4 is a diagram illustrating an example of a UI for virtual printer settings.

FIG. 4 illustrates an example of a virtual printer setting UI. A main screen 400 is a main screen of a virtual printer setting UI. A virtual printer name input portion 401 is an input field for inputting a name to be given by the user. By touching a setting button 402, a virtual printer is created, set, and registered with the name inputted into the virtual printer name input portion and each setting.

In the virtual printer setting UI 400, a name of post-processing, a check mark (a usage check) for designating whether or not to use it, and a check mark (a lock check) for indicating whether or not to lock a corresponding setting are displayed. By turning a use check off and a lock check on, a corresponding post-processing can be turned off. In the present embodiment, the virtual printer name "for reference image registration" is displayed in the virtual printer name input portion 401, use checks (403, 405) for post-processes are set to off and lock checks (404, 406) are set to on.

When the setting button 402 is pressed by the user, the print control device 101 reflects the settings of the virtual printer setting UI 400 to corresponding values of the settings of a virtual printer.

Since the association between an operation mode and a virtual printer is made by its name, the inspection mode is given a name that has been reserved in advance, for example, a name such as "for inspection printing". This name links the inspection mode with the virtual printer for inspection printing. However, in the UI of FIG. 4, a field for designating an operation mode to be further associated may be provided, for example, by a check box, radio button, or the like. In this case, a virtual printer can be associated with the designated operation mode irrelevant to the name of the virtual printer.

Effects of Present Embodiment

By virtue of the present embodiment described above, by designating an operation mode and then executing a print job, it becomes unnecessary to manually change the settings of the print job at the time of registration of a reference image and at the time of printing of a product. Therefore, in addition to improving productivity, it is possible to register a reference image that corresponds to a printed image at the time of inspection, which contributes to improvement in the accuracy of inspection.

Second Embodiment

In the first embodiment, in the reference image registration mode, registration processing is performed with the all post-processing turned off. However, this makes it so that it is not known whether the post-processing settings are correct until inspection printing is performed. Therefore, in the present embodiment, at the time of registration of a reference image, a reference image for which the settings are such that post-processing is not performed and a reference image for which the settings are such that post-processing is performed are registered. In this way, in the present embodiment, it is possible to confirm post-processing together with the registration of a reference image. In the present embodiment, description will be given focusing on the differences from the first embodiment.

In the present embodiment, a configuration for confirming the settings of post-processing by performing post-processing only for one copy (a booklet) of a plurality of copies using the single-copy-post-processing button 307 of FIG. 3 will be described using an example of a print product (an album) manufactured by printing and a process by the post-processing units (the perfect binding unit and the cutting unit).

Figure 6:
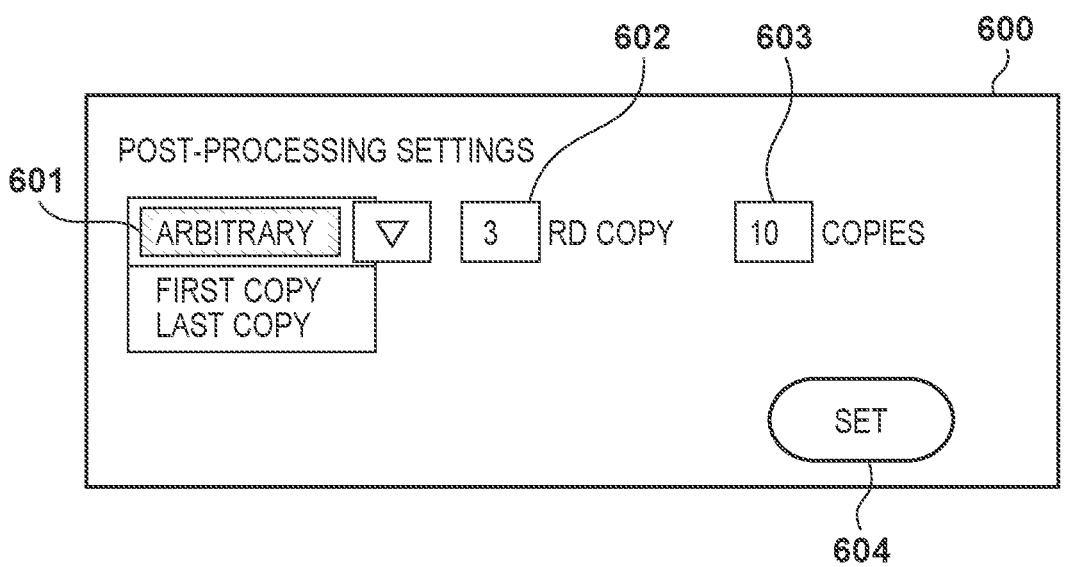
FIG. 6 is a diagram illustrating an example of a UI for designating copies to be subjected to post-processing.

In the present embodiment, post-processing can be performed for only one copy in the reference image registration mode. For this, when the user selects a job in the job list 302 of UI 300 (FIG. 3) of the print control device 101 and presses the single-copy-post-processing button 307, the print control device 101 displays a screen 600 of FIG. 6.

In the screen 600, a position designation portion 601 is an input portion for designating the position of a single copy (a booklet) which will be subjected to post-processing. If the last copy or the first copy is selected in the position designation portion 601, the last copy or the first copy, respectively, will be subjected to post-processing. An order designation portion 602 is an input portion for designating which copy is to be subjected to post-processing when an arbitrary copy is designated by the position designation portion 601. A copy count input portion 603 is a copy count input portion for inputting how many instances of printing is necessary when creating a reference image. A setting button 604 is a button for confirming the settings for post-processing a single copy.

When the setting button is pressed by the user with the number of copies as 10 and the designated copy as 3, the values of the settings for post-processing a single copy are read into the print control device 101 from the screen 600 as in Table 5 below. In the present embodiment, when 0 is designated as a post-processing position, it is assumed that all the post-processing is turned off in the reference image registration mode in the same manner as in the first embodiment.

TABLE 5

Settings for Post-Processing Single Copy

| Item | Value |
|---|---|
| Number of Copies | 10 |
| Post-Processing Position | 3 |

<Processing for Registering Reference Image>

Figure 9:
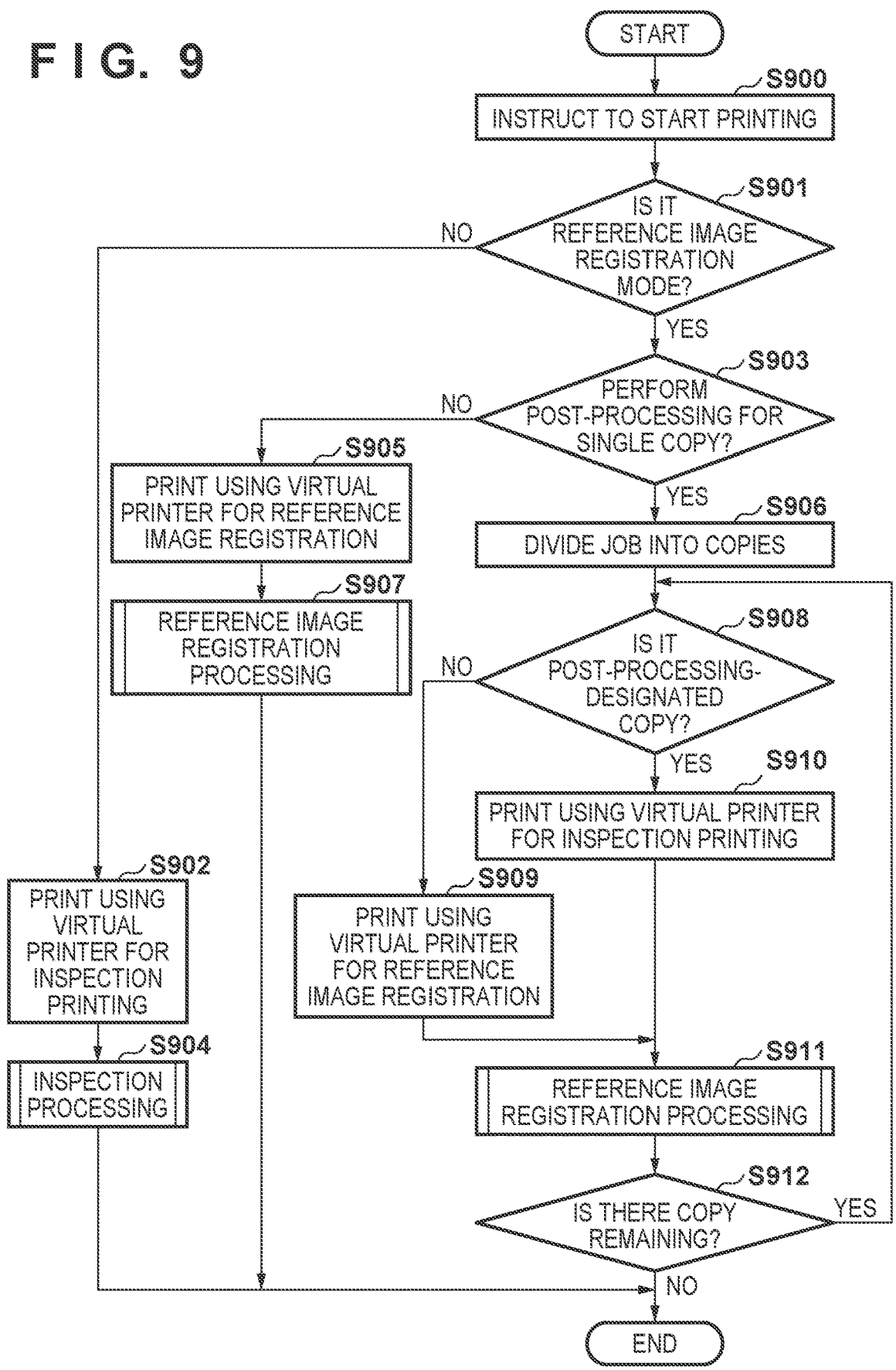
FIG. 9 is a processing flow of the print control device of a second embodiment of the present invention.

FIG. 9 is an operation flowchart for when the user designates a position at which post-processing is to be performed for a single copy. This procedure is performed by the print control device 101, but printing and inspection processing is performed by the image forming device 107. It is assumed that the operation mode at the start of FIG. 9 including the designation of processing for a single copy has been designated.

In step S900, the print control device 101 receives a print start instruction by the user operating the print button 303. A job selected in the job list 302 is the processing target.

In step S901, the print control device 101 determines whether the mode is the reference image registration mode by reading out a value designated by the operation mode switching toggle buttons 301 and set for the variable MotionMode, and if the mode is the reference image registration mode, the processing proceeds to step S903, and if not, the processing proceeds to step S902.

In step S902, similarly to step S802 of FIG. 8, the print control device 101 selects the virtual printer for inspection processing, starts printing the job to be processed determined in step S900, and then proceeds to step S904. In step S904, the print control device 101 performs the inspection processing indicated in step S1303 to step S1310 of FIG. 13.

In step S903, the print control device 101 reads the value of a post-processing position for the settings for post-processing a single copy and, if it is 0, determines that post-processing for a single copy will not be performed and that processing will be carried out without any post-processing and then proceeds to step S905 and, if the value of the post-processing position is not 0, proceeds to step S906.

In step S905, similarly to step S803 of FIG. 8, the print control device 101 selects the virtual printer for reference image registration, starts printing the job to be processed determined in step S900, and then proceeds to step S907. In step S907, the print control device 101 performs the reference image registration processing indicated in step S1203 to step S1207 of FIG. 12.

In step S906, the print control device 101 resets a counter I to 1 and proceeds to step S908 in order divide the job into copies and then perform processing. In step S908, the print control device 101 compares the value of the post-processing position for the settings for post-processing a single copy with the value of the counter I and, if they do not coincide, proceeds to step S909 and, if they coincide, proceeds to step S910.

In step S909, similarly to step S905, the print control device 101 selects the virtual printer for reference image registration, starts printing the job to be processed determined in step S900, and then proceeds to step S911.

In step S910, similarly to step S902, the print control device 101 selects the virtual printer for inspection processing, starts printing the job to be processed determined in step S900, and then proceeds to step S911.

In step S911, the print control device 101 performs the reference image registration processing in the same manner as in step S907. In step S912, the print control device 101 compares the value of the counter I with the value of the number of copies for the settings for post-processing a single copy and, if it is equal to the value of I, ends the processing and, otherwise, increases the value of the counter I by 1 and then returns the processing to step S908.

With the above configuration and procedure, when registering a reference image, it is possible to register and then output an image on which post-processing has not been performed and an image on which post-processing has been performed. In addition, it is possible to confirm post-processed final result with the minimum number of copies to be post-processed at the time of reference image registration.

Third Embodiment

In the present embodiment, an example in which a print product (a foil-stamped flyer) manufactured in a process by a foil stamping unit and a cutting unit as processing units is a target will be described.

In the first embodiment, a virtual printer in which no post-processing has been set and then locked has been used as a virtual printer in the reference image registration mode. This is not a problem when all post-processing to be used is performed after image acquisition by the image reading unit 109. However, if post-processing to be performed before image reading is not set and then locked, there is a problem that a reference image and an inspection image (an image to be acquired at the time of inspection) do not match.

The above problem will be described with reference to the drawings. In FIG. 11, a sheet on which an image has been formed is first subjected to post-processing of foil stamping, is then read by the image reading unit 109, and finally subjected to post-processing of cutting. Settings 1100 are setting values of a virtual printer for reference image registration, and all post-processing is off. In settings 1101, foil stamping is turned on, and so, the processing of foil stamping can be performed.

When the printing results of these virtual printers are compared with the printing result of a virtual printer for inspection printing with settings 1102, since the virtual printer with the settings 1100 is executed before image reading, a result of foil stamping is not reflected. In contrast, if the settings are the settings 1101, foil stamping is reflected, and an image in which foil stamping has been applied is acquired by the image reading unit 109.

Also, depending on the position of stapling or punching, an image may be rotated. For example, a mechanism for stapling or punching may be fixedly provided, and it may be necessary to move the sheet to be aligned with the position of the mechanism. In such a case, if a virtual printer in which the post-processing of stapling and punching are not set and then locked is used, the direction of an image may change and a reference image and an inspection image may not coincide. That is, there may be post-processing that affects the reference image despite it being downstream of the image reading unit 109.

Therefore, in the present embodiment, a virtual printer in which post-processing to be turned off and post-processing to not be turned off at the time of reference image registration are classified and then setting is performed in accordance with that classification is generated based on information on the order in which post-processing is to be executed. In the present embodiment, post-processing to be performed before passing the image reading unit 109 is referred to as pre-reading post-processing, and post-processing to be performed after passing the image reading unit 109 is referred to as post-reading post-processing. Pre-reading post-processing and post-reading post-processing correspond to post-processing to not be turned off and post-processing to be turned off, respectively. Even if the processing itself is to be performed after passing through the image reading unit 109, such as stapling described above, there is post-processing that requires preparation processing that causes a difference from an image to be formed during actual printing, such as a rotation of a sheet. If that preparation processing is to be performed before the passing the image reading unit 109, it will be deemed pre-reading post-processing.

<Processing for Registering Reference Image>

FIG. 10 illustrates an example of a method for obtaining a product and determining a virtual printer. A job ticket 1000 is an example of a job ticket, and an item Product ID indicates the type of product (album). The print control device 101 obtains a value "album" of the item Product ID from the job ticket 1000. The print control device 101 searches for a row whose "product name" item value is "album" from a virtual printer table 1001 of Table 6 and obtains a value "perfect binding_cutting_OFF" of an item "virtual printer name" of that row. The print control device 101 uses a virtual printer "perfect binding_cutting_OFF" 1002 for registration of a reference image for a product "album". If Product ID is a foil-stamped flyer, a virtual printer "cutting_OFF" is used for registration of a reference image.

Table 6 indicates an example of the virtual printer table 1001 stored in the print control device 101. The virtual printer table is a table for storing a pair of a product name and a virtual printer name that are associated.

TABLE 6

Virtual Printer Table

| Product Name | Virtual Printer Name |
|---|---|
| Album | Perfect Binding_Cutting_OFF |
| Foil Stamped Flyer | Cutting_OFF |
| Catalog | Saddle Stitching_Cutting_OFF |

In the example of Table 6, in the virtual printer "perfect binding_cutting_OFF", the settings for perfect binding and cutting are both set to off and locked. In the virtual printer "cutting_OFF", the settings for cutting is set to off and locked. In the virtual printer "saddle stitching_cutting_OFF", the settings for saddle stitching and cutting are both set to off and locked. Therefore, for example, when a job of a product "foil-stamped flyer" in which foil stamping is set as post-processing is executed using the virtual printer "cutting_OFF", foil stamping is be executed.

<Generation of Virtual Printers>

The print control device 101 generates the virtual printer for inspection printing 106 under the name, "for inspection", at startup. At this time, in the virtual printer for inspection printing, settings have been made so as to neither designate nor lock post-processing and use the settings set in a job.

Figure 5:
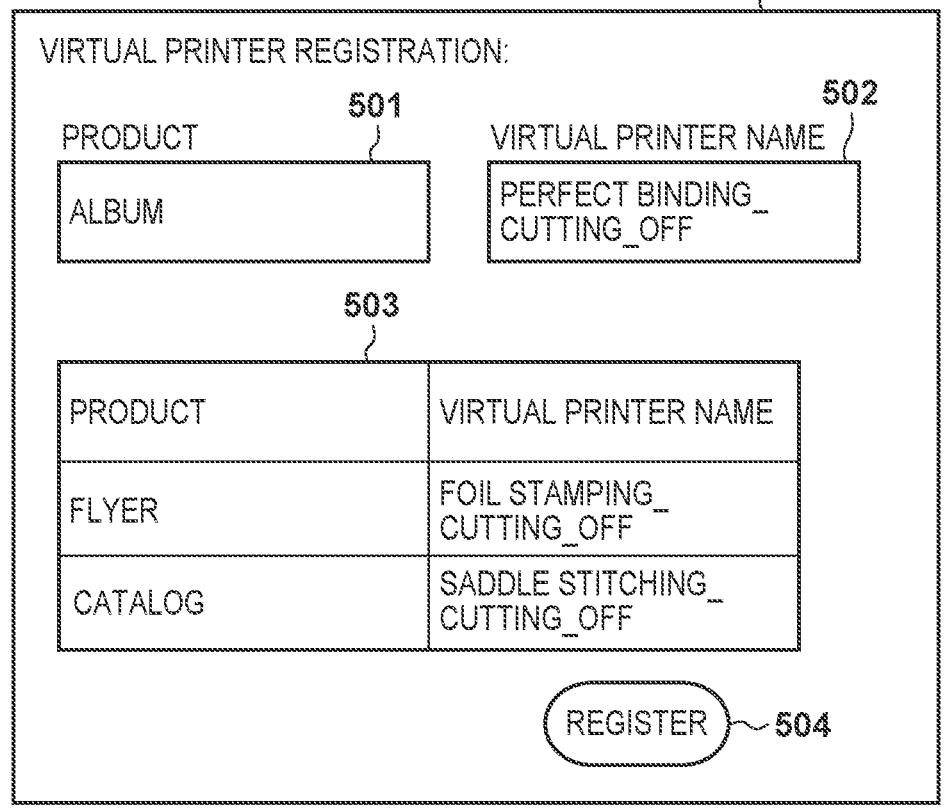
FIG. 5 is a diagram illustrating an example of a UI for virtual printer registration.

FIG. 5 illustrates a UI displayed by the print control device 101 to create a virtual printer table in which a product name and a virtual printer are associated.

A UI screen 500 is a screen of an UI for associating a product and a virtual printer. A product name input portion 501 is an input portion for a product name to be associated. A virtual printer name input portion 502 is an input portion for the name of a virtual printer to be associated. The user creates in advance a virtual printer having settings in which suitable post-processing is performed in accordance with a product using the UI for creating virtual printers illustrated in FIG. 4. A virtual printer table display portion 503 is a display portion for displaying the content of the virtual printer table. A registration button 504 is a button for registering the correspondence between a product and a virtual printer.

When the user inputs "album" to the product name input portion 501 and "perfect binding_cutting_OFF" to the virtual printer name input portion 502 and further presses the registration button 504, a set of values of the product name 501 and the virtual printer name 502 is added to the virtual printer table. They are then stored in the print control device 101.

Figure 15:
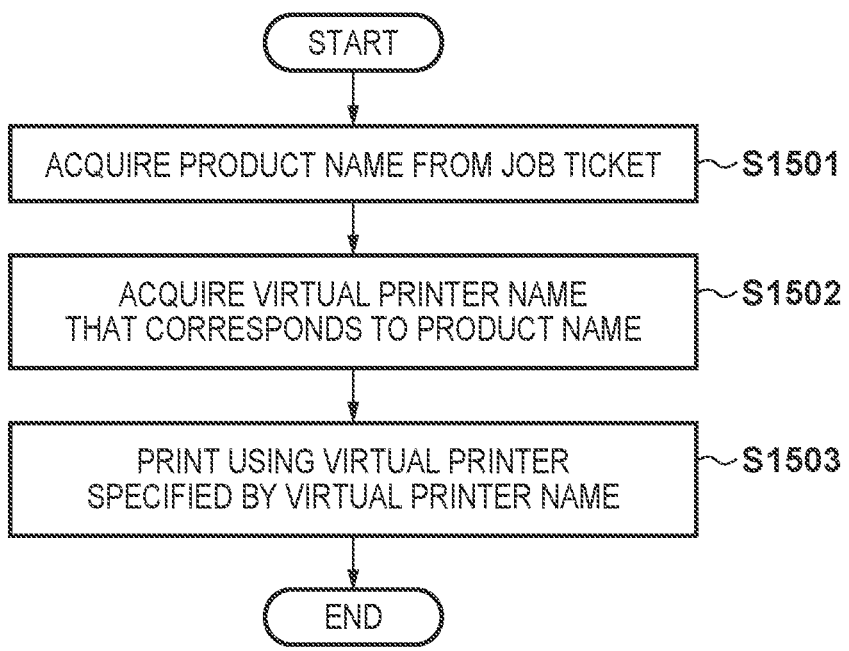
FIG. 15 is a processing flow for selecting a virtual printer from information on a product name.

FIG. 15 illustrates a processing flow in which the print control device 101 selects a virtual printer to be used in processing at the start of printing (step S1202 or step S1302) by using the virtual printer table.

In step S1501, the print control device 101 acquires an item of product name from the job information on a print target job stored in the job management unit 104.

In step S1502, the print control device 101 refers to the virtual printer table and acquires a virtual printer name corresponding to the product name acquired in step S1501.

In step S1503, the print control device 101 selects a virtual printer having the virtual printer name acquired in step S1502 and starts printing the job.

The procedure of FIG. 15 is processing in the reference image registration mode and may be performed in place of the procedure of FIG. 8 if the mode is the reference image registration mode in step S1202 of FIG. 12, for example. If the mode is not the reference image registration mode, the print job may be executed using the virtual printer for inspection printing 106.

Here, for example, foil stamping is upstream of the image reading unit 109. When the virtual printer "cutting_OFF" corresponding to the foil-stamped flyer is used, it is assumed that cutting is set to off and locked, but foil stamping is not locked. In this case, since foil stamping is performed as post-processing, a foil-stamped sheet is read as a reference image, and a foil-stamped sheet is also read as an inspection target at the time of inspection. Therefore, it is possible to avoid failure caused by the presence or absence of foil stamping due to the timing of the inspection. This can also be applied, for example, to the rotation of a sheet for stapling and the like. In this case, a staple setting should not be locked.

By virtue of the present embodiment, it is possible to use a virtual printer associated with information such as, for example, a product type associated with a job without limiting the number of virtual printers for registering a reference image to one. Thus, it is possible to perform automatic setting of a virtual printer for reference image registration in which a configuration of post-processing units, which differ for each type of product, is reflected, which makes it possible to reduce setting errors due to manually performing setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-096034, filed Jun. 8, 2021, which is hereby incorporated by reference herein in its entirety.

What is claimed is:

1. A print control system comprising:
   an image forming device configured to form an image onto a sheet in accordance with a print job;
   an image reader configured to read an image of the sheet;
   an inspection device configured to inspect a quality image read by the image reader by comparing the image read by the image reader with a reference image read by the image reader and registered in advance;
   at least one processor; and
   at least one memory having at least one program, wherein the at least one processor executes the at least one program in order to:
      in a case where the reference image is to be registered:
         control the image forming device to form a first image using a first virtual printer having a predefined first print setting that deactivates one or more post processing print settings;
         control the image reader to read the first image; and
         register, as the reference image, the first image read by the image reader; and
      in a case where a product is to be produced:
         control the image forming device to form a second image using a second virtual printer having a predefined second print setting that activates the one or more post processing settings deactivated in the first print setting;
         control the image reader to read the second image; and
         inspect the second image read by the image reader by comparing it to the second image read by the image reader and registered as the reference image.

2. The print control system according to claim 1, wherein the first print setting is a setting in which post-processing is not performed, and the second print setting is a setting that accords with the print job.

3. The print control system according to claim 1, wherein the first print setting is a setting that accords with the print job for one copy among a plurality of copies and deactivates post-processing for others, and the second print setting is a setting that accords with the print job.

4. The print control system according to claim 1, wherein the first print setting is a setting that deactivates post-processing in accordance with a type of product designated in the print job, and the second print setting is a setting that accords with the print job.

5. The print control system according to claim 4, wherein regarding the first print setting, one or a set of a plurality of print settings are provided in advance in accordance with the type of product, and a set of settings that accords with the type of product designated in the print job is used.

6. The print control system according to claim 2, wherein in the first print setting, among the post-processing, post-processing that, by being deactivated, affects a quality of an image to be read by the image reader is not deactivated.

7. The print control system according to claim 6, wherein the post-processing that affects the quality of the image to be read by the image reader includes post-processing positioned upstream of the image reader in a direction of conveyance of the sheet.

8. The print control system according to claim 6, wherein the post-processing that affects the quality of the image to be read by the image reader includes post-processing that necessitates preparation upstream of the image reader in a direction of conveyance of the sheet.

9. The print control system according to claim 8, wherein the image forming device is capable of changing a direction of a sheet that is conveyed, and
the post-processing that necessitates preparation upstream of the image reader includes at least one of a device that binds sheets at a fixed position or a device that performs hole punching at a fixed position.

10. The print control system according to claim 1, wherein the at least one processor and the at least one memory are included in an information processing apparatus, and
the first print setting and the second print setting are settings of the first and second virtual printers that are each generated by the information processing apparatus.

11. The print control system according to claim 10, wherein
the image forming device, the image reader, and the inspection device are included in an image forming apparatus.

12. The print control system according to claim 1, wherein the at least one processor executes the at least one program in order to select either the first print setting or the second print setting in accordance with a designated operation mode.

13. A non-transitory computer-readable storage medium storing at least one program, wherein
the at least one program, when executed by a processor, causes the processor to execute control of an image forming apparatus, wherein
the image forming apparatus includes an image forming device that forms an image on a sheet in accordance with a print job, an image reader that reads an image of the sheet, and an inspection device that inspects a quality image read by the image reader by comparing the image read by the image reader with a reference image read by the image reader and registered in advance, and
the control includes, in a case where the reference image is to be registered, causing the image forming device to form a first image using a first virtual printer having a predefined first print setting that deactivates one or more post processing print settings,
registering, as the reference image, an image read by the image reader, and
in a case where a product is to be produced, causing the image forming device to form a second image using a second virtual printer having a predefined second print setting that activates the one or more post processing settings deactivated in the first print setting.

14. A print control method by a print control system that controls an image forming apparatus having an image forming device that forms an image on a sheet in accordance with a print job, an image reader that reads an image of the sheet, and an inspection device that inspects a quality image read by the image reader by comparing the image read by the image reader with a reference image read by the image reader and registered in advance, wherein
the print control system,
in a case where the reference image is to be registered, causes the image forming device to form a first image using a first virtual printer having a predefined first print setting that deactivates one or more post processing print settings, and
registers, as the reference image, an image read by the image reader, and
in a case where a product is to be produced, causes the image forming device to form a second image using a second virtual printer having a predefined second print setting that activates the one or more post processing settings deactivated in the first print setting.

15. A print control apparatus connected to an inspection system that inspects a quality of a print product formed by an image forming device by comparing an image of the print product with a reference image registered in advance, comprising:
at least one processor, and
at least one memory having at least one program, wherein
the at least one processor executes the at least one program in order to:
in a case where a job for registering the reference image is transmitted to the inspection system, transmit the job as a first job that changes a set value of a predetermined setting into a predetermined value; and
in a case where a job for performing inspection is transmitted to the inspection system, transmit the job as a second job that does not change the set value of the predetermined setting.

16. The print control apparatus according to claim 15, wherein
the at least one processor executes the at least one program in order to:
in a case where the job for registering the reference image is transmitted to the inspection system, transmit the first job of which the set value of the predetermined setting has been turned off.

17. The print control apparatus according to claim 15, wherein
the predetermined setting is a setting relating to post-processing.

18. The print control apparatus according to claim 15, further comprising:
a first virtual printer that turns off a set value of the predetermined setting, and
a second virtual printer that does not change the set value of the predetermined setting,
wherein
in a case where the job for registering the reference image is transmitted to the inspection system, the first virtual printer is selected and the first job is transmitted, and
in a case where the job for inspection is transmitted to the inspection system, the second virtual printer is selected and the second job is transmitted.

* * * * *